Feb. 11, 1941. H. BECKER ET AL 2,231,378
MOTION PICTURE PRINTING MACHINE
Filed Aug. 6, 1938
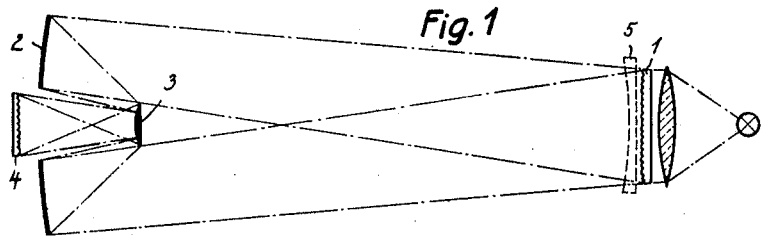
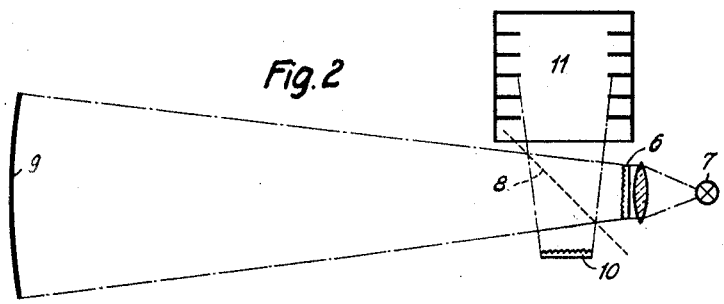
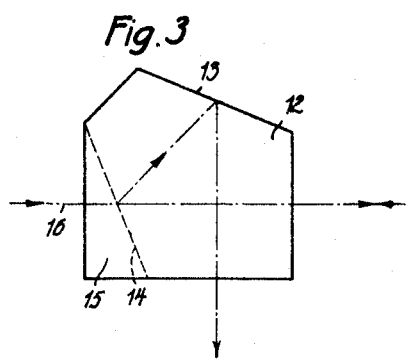
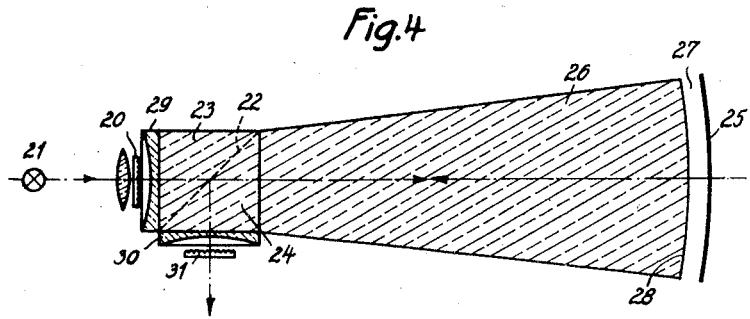

Patented Feb. 11, 1941

2,231,378

UNITED STATES PATENT OFFICE 2,231,378

MOTION PICTURE PRINTING MACHINE

Herbert Becker, Berlin-Charlottenburg, Werner Bender, Berlin-Hasselhorst, and Walter Ströble, Berlin-Charlottenburg, Germany, assignors, by mesne assignments, to Kislyn Corporation, New York, N. Y., a corporation of Delaware Application August 6, 1938, Serial No. 223,430
In Germany August 11, 1937

3 Claims. (Cl. 88—24)

The present invention relates to motion picture printing machines, particularly for lenticulated films.

When motion picture films, particularly lenticulated films, are printed by projection it is well known that an image forming catoptrical system may be employed for projection of the film image so as to reduce as far as possible the creation of diffused light. In these machines the film gates for the original film and the copy film have hitherto been so arranged that they lie side by side and that, consequently, the optical axis of the projecting system passes between the two films. The projecting system is, therefore, employed at a considerably greater image angle than that required by the particular requirements of lenticular film and of the available focal length of the optical system so that the quality of the image becomes much more inferior when used at such an excessively wide angle.

To avoid these difficulties the film gates are arranged in this invention so that both lie on the optical axis of the projecting system which includes at least one curved reflecting surface. In this case it is preferable to cause the center of both film images to coincide with the optical axis in order to place the areas of best definition at the parts of the images where the chief attention is centered. Furthermore, the sharpness in this case is symmetrically distributed and the marginal errors minimized.

Further details of the invention will be apparent from the following description in connection with the accompanying drawing.

Figures 1 to 4 are respectively diagrammatic views of copying arrangements according to the invention.

In Fig. 1, 1 represents a lenticulated film illuminated by any suitable method in which it is projected on the lenticulated film 4 with the aid of the spherical mirrors 2 and 3. The dimensions of the spherical mirrors and the position of the film guides with respect to the mirrors are so chosen in the embodiment shown that the projected images are reduced in size. The image frames of both films are centered in the optical axis of the spherical mirrors.

In order not to intercept appreciably the path of the rays from the original film 1 to the copy film, the mirror 3 is kept relatively small and besides is so calculated in connection with the aperture of the mirror 2 that its shadowing effect is approximately equal for all image elements. It is true that a portion of the luminous beams issuing from the original film is, therefore, cut off. This loss is, however, of no importance in the case of color records which are correctly situated under the lenticular elements. If, for instance, images to be reproduced in colors taken with a filter zoned in bands or stripes are to be printed with this arrangement, the mirror 3 will stop only a small portion of the light corresponding to the central zone, whereas the remainder passes to the spherical mirror 2 without hindrance and then to the printing film 4 by way of the mirror 3. On the other hand, it is possible, for instance, when printing lenticular stereoscopic films which have two part images, to arrange the illumination of the images under the lenticulated elements in such a manner that their respective luminous beams pass by either side of the mirror 3 to the right and the left.

Furthermore, in Fig. 1 there is indicated a field lens 5 which causes the virtual filter plane recorded on the original film to coincide with the inlet pupil of the catoptrical system. A corresponding focal length of the field lens may also be employed for the film 4 if the distance of the outlet pupil does not agree with the distance to the filter to be used during projection.

In order to avoid interception of a portion of the light issuing from the original film as described above, a light splitting system is arranged between the film gates and the projecting catoptrical system. This light splitting system divides, for instance, an axial ray coming from the projected film into two rays, one of which is diverted into space while in the continuation of the other is arranged the gate of the copy film.

In Fig. 2 is shown a printing arrangement in which a partially transparent mirror is employed as a light splitting system. 6 denotes a lenticulated film which is illuminated with the aid of a light source 7. The light passes through the partially transparent mirror 8 and passes to the projecting concave mirror 9 which in the embodiment shown in Fig. 2 is so arranged that its center of curvature coincides with the center of the film image 6. The image of the film 6 would, therefore, coincide with the original if the luminous beams reflected on the mirror 8 were not diverted to the copy film 10 by the partially transparent mirror 8. This arrangement has the advantage over the arrangement shown in Fig. 1 in that the shading of a partially transparent mirror is uniformly distributed over the entire luminous beam and in this manner causes only a general loss of intensity. Furthermore, it is possible by this arrangement to employ as a projecting system a single spherical concave mirror in the foci of which are arranged the original film and the copy film so that optical errors are completely corrected at least for the image centers if the hollow mirror has the requisite aperture and size. The mirror 8 may be made reflective either only on its side facing the hollow mirror 9 or may also reflect the rays on both sides. In this case the light coming from the original film and diverted from the projected beam by the partially transparent surface is preferably absorbed in a blackened hollow chamber 11 provided with black screens.

The mirror serving as a light splitting system may be produced either by a partially transparent reflecting surface or consist in the form of a reseau, the different areas of which are completely transparent or completely reflecting. In this case, the direction of the single reseau bands is preferably so chosen that their projections on the copy film enclose an angle with their direction of lenticulation differing by 0°, i. e., parallel. It is also possible to employ partially transparent prisms instead of the partially transparent mirrors or to utilize a partial reflection on thin layers of air which are limited by plane glass surfaces. In this case, the partial total reflection may be effected either by a reseau-like arrangement of the reflecting points or by a corresponding choice of the distance between the limiting surfaces which is preferably of the order of a wave length of light.

In order to create as contrasting images as possible the partially transparent mirrors are preferably so designed as to be limited on both sides by glass. In this manner the insertion of further limiting surfaces of glass against air is avoided as far as possible and the losses of reflection occurring at such surfaces are minimized. In this case the glass bodies limiting the mirrors are provided with walls lying perpendicular to the optical axis in order to avoid to a great extent a deviation of the luminous rays in accordance with the angle of incidence and with the refractive index of the glass. Furthermore, it may be preferable to combine field lenses with these glass bodies, which field lenses are either cemented or ground on the glass body at the time they are made. When using such field lenses together with the glass bodies their surfaces need not be plane but may also be curved for correcting the projection of the catoptrical system.

If it is necessary to turn upside down or reverse the images produced in a printing arrangement according to the invention, the mirrors employed therefor are preferably combined with the light splitting system. Such a system is shown in Fig. 3. The pentaprism 12, one of whose surfaces 13 is totally reflective, whereas the surface 14 is partially transparent, is employed for inverting the image. Furthermore, on this surface is cemented the prism 15 which represents a plane of incidence traversed perpendicularly by the light for the luminous ray 16 coming from the original film. The luminous ray after reflection in the catoptrical system is in part deviated by the partially transparent surface 14 in the direction towards the surface 13 and then it is directed to the copy film. The above-described arrangement has, furthermore, the advantage that the image produced on the copy film remains unaltered if the light splitting system is rotated at a small angle about an axis perpendicular to the direction of the light. When adjusting it is, therefore, not absolutely necessary to fix the deviating system exactly in its proper position.

To further reduce the diffused light in the printing apparatus glass or other media having a refracting index greater than 1.3, for instance, water, through which the light is caused to pass, may be arranged between the light splitting system and the projecting catoptrical system. In Fig. 4 such an arrangement is shown.

The lenticulated film 20 is illuminated with the aid of a light source 21. A plain semi-transparent mirror 22 which is enclosed between two rectangular prisms 23 and 24 serves to split up the rays. Between these prisms and the projecting concave mirror 25 is arranged the block of glass 26 which may consist of a single piece or of glass plates united intimately with one another by optical contact or by cementing them together. The block of glass extends in the immediate neighborhood of the concave mirror 25 which has a reflecting surface and is separated from the latter only by a small gap 27 in which, if desired, variable diaphragms may be disposed in order to rectify color balances in the luminous beams allotted to the part colors during the printing.

In order not to introduce any further errors of projection by the surface 28 of the block of glass 26 the surface is so curved that it has the same center as the mirror 25. In this manner there results an air gap limited by concentric surfaces which is negligible, since the images produced by reflection on the surface 28 coincide with the main image. The prisms 23 and 24 may be cemented to the field lenses 29 and 30 which convert the virtual filter image of the original film 20 into the plane of the concave mirror 25 and this plane into the filter position of the copy film 31 required for exhibition. In order to render possible at the same time a proper correction of the concave mirror errors by the field lenses it is preferable to use a mirror of such great focal length that the distances between the pupils become greater than the greatest of the virtual filter distances of the original film and the copy film. In observance to this condition the field lenses are given negative refracting surfaces and, therefore, possess errors which are canceled by those of the concave mirror.

When using curved film gates for transforming the positions of the filters the curvatures may be so chosen that when considering an existing image field curvature of the projecting system, the copy film will lie exactly in the same image curvature as that of the projected original film. In this case, the films are preferably so curved that the directions in which the films are curved cross each other, preferably perpendicular to each other. The radii of curvature of the cylindrical film guides are preferably so chosen that in the case of a predetermined change of the filter position the virtual filter distances recorded on the films are caused to coincide with the pupil of the projecting system, if desired, with the aid of other optical means arranged in the path of the rays.

As a catoptrical system a concave mirror is preferably employed which is either applied to a correspondingly curved surface of the block of glass arranged between the light splitting system and the mirror or is placed close to a special glass body having preferably concentrical surfaces. In this manner, the use of surface mirrors with a surface which may be easily damaged is avoided in the printing arrangement, whereas by the glass surfaces inserted no further errors of projection are caused. Under certain circumstances, the glass body with integral reflecting coating may be used, for instance, in the form of a mirror lens to eliminate the remaining errors of image formation.

Furthermore, the above-described arrangement may be employed not only for printing lenticulated films but also for any sort of film.

What is claimed is:

1. In a printing apparatus comprising an original film and a copy film, a projection system having its axis passing through the centers of said films and comprising a concave mirror having its center and its center of curvature on said axis, and a reflector likewise having its center on said axis and disposed between said concave mirror and said copy film and so spaced from the mirror and the copy film as to focus the image of the mirror directly on the copy film.

2. In a printing apparatus comprising an original film and a copy film disposed parallel to each other, a projection system having its axis passing through the centers of said films and comprising a reflector likewise on said axis and having its reflecting surface facing the copy film and a concave mirror having its center and its center of curvature on said axis and disposed on the opposite side of said reflector from said original film and in position to catch light from said original film and reflect it to said reflecting surface of said reflector.

3. In a printing apparatus comprising an original film and a copy film, a projection system having its axis passing through the centers of said films and comprising a concave mirror having its center and its center of curvature on said axis, and a reflector likewise having its center on said axis and disposed between said concave mirror and said copy film and so spaced from the mirror and the copy film as to focus the image of the mirror directly on the copy film, said reflector being partially transparent, whereby light may pass therethrough from the original film to the copy film.

HERBERT BECKER.
WERNER BENDER.
WALTER STRÖBLE.